United States Patent Office 3,388,188
Patented June 11, 1968

3,388,188
CROSS LINKED CHLOROPRENE POLYMERS AND BLENDS THEREOF WITH BENZENE SOLUBLE CHLOROPRENE POLYMERS
Alan Charles Sturt, Worcester Park, England, assignor to The Distillers Company Limited, Edinburgh, Scotland, a British company
No Drawing. Filed Dec. 7, 1965, Ser. No. 512,233
Claims priority, application Great Britain, Jan. 2, 1965, 201/65
4 Claims. (Cl. 260—890)

ABSTRACT OF THE DISCLOSURE

A method for making a crosslinked polymer and blends of this polymer with solid benzene soluble chloroprene polymers the blends having good processing properties. The crosslinked polymer is made by polymerizing chloroprene in aqueous emulsion at average tempteratures $T$ in the range 70 to 85° C. at an average conversion of monomer to polymer $\overline{R}$ in the range 0.5 to less than 0.8.

---

The present invention relates to a process for making a cross-linked chloroprene polymer, the polymer formed by the process and compositions containing this polymer.

The process for making a cross-linked chloroprene polymer according to the present invention comprises polymerising 2-chloro-1,3-butadiene or 2-chloro-1,3-butadiene and no more than 20 percent by weight based on the total weight of monomeric material of a copolymerisable monomer or monomers in an aqueous emulsion system using incremental and/or continuous addition of monomeric material at an average temperature $\overline{T}$ as hereinafter defined in the range 60° C. to 100° C. and an average value $\overline{R}$ as hereinafter defined in the range 0.5 to less than 0.8, for the conversion ratio R, where $$R = \frac{\text{weight of polymer}}{\text{weight of polymer plus unpolymerized monomeric material}}$$

by an average temperature $\overline{T}$ is meant the value obtained from the expression $$\overline{T} = \int_0^{t_f} \frac{T}{t_f} \cdot dt$$

where T is the centigrade temperature at any stage during the polymerisation, $t$ is the time after polymerisation is initiated and $t_f$ is the time when the polymerisation is stopped. The preferred average temperature $\overline{T}$ is in the range 70° C. to 85° C.

By an average value $\overline{R}$ is meant the value obtained from the expression $$\overline{R} = \int_0^{P_f} \frac{P}{P+M} \cdot dP$$

where $P_f$ is the total weight of polymer formed at the end of the polymerisation, and P and M are the weights of polymer and monomeric material respectively present at any stage in the polymerisation. Most suitably the average value $\overline{R}$ should not exceed 0.75. The preferred average value $\overline{R}$ is in the range 0.65 to 0.75.

It will be appreciated that in a polymerisation system from which no unreacted monomeric material has been removed the value of the conversion ratio R when multiplied by 100 becomes the percentage of monomeric material converted to polymer at any stage of the polymerisation and the average value $\overline{R}$ becomes the average percentage of monomeric material converted to polymer during the entire polymerisation.

There are numerous ways in which the polymerisation can be carried out to give an average value $\overline{R}$ in the range 0.5 to less than 0.8. The preferred method is to add the monomeric material together with a polymerisation initiator continuously at a constant rate to the other components of the polymerisation system and allow the polymerisation to continue for a short while after the addition of the monomeric material has been stopped. The rate of addition of monomeric material is such as to ensure that the average value $\overline{R}$ falls within the desired range. It is not essential that the conversion ratio R at any given moment be within the desired range for $\overline{R}$.

The conventional free radical type of polymerisation initiator can be used in the polymerisation system. Some examples of such initiators are ammonium persulphate and other water soluble salts of persulphuric acids such as sodium persulphate and potassium persulphate. Other examples are hydrogen peroxide and cumene hydroperoxide. The initiator is usually added to the polymerisation system as an aqueous solution at such a rate that the desired rate of polymerisation is maintained. The rate of polymerisation can be determined by measuring the specific gravity of the emulsion during the polymerisation.

The polymerisation must be carried out in an aqueous emulsion system. Any conventional emulsifying agents may be used in making this emulsion. These agents include the water soluble salts particularly the sodium, potassium or ammonium salts of long chain fatty acids; rosins and rosin derivatives such as wood rosin, disproportionated rosin or hydrogenated rosin; higher alcohol sulphates; aryl sulphonic acids such as nonyl benzene sulphonic acid and formaldehyde condensates of aryl surphonic acids. A specific example of a disproportionated rosin acid is Dresinate 214 (a registered trademark) which is described as the potassium salt of a disproportionated rosin acid, and a specific example of an aryl sulphonic acid is Daxad 15 (a registered trademark) which is described as the sodium salt of a condensate of formaldehyde with naphthalene sulphonic acid.

It is preferred to carry out the polymerisation in the absence of conventional modifying agents such as for example the aliphatic mercaptans.

The pH of the polymerisation system may be slightly acidic, neutral or in the alkaline range. It is preferred to conduct the polymerisation at a pH in the range 7 to 13.5.

The polymerisation is carried out using the known techniques for chloroprene polymerisation in which oxygen is excluded from the atmosphere in the polymerisation vessel. This is conveniently done by sweeping the vessel with a stream of an inert gas such as nitrogen and maintaining an atmosphere of nitrogen above the polymerisation charge.

The copolymerisable monomer can be any monomer containing ethylenic unsaturation capable of undergoing addition polymerisation with 2-chloro-1,3-butadiene. Some examples are styrene, acrylonitrile and 2,3-dichloro-1,3-butadiene.

The process described gives a cross-linked chloroprene polymer which when blended with solid benzene-soluble chloroprene polymers in certain proportions yields compositions having exceptionally good processing properties.

Useful compositions containing a cross-linked chloroprene polymer according to the present invention comprise (a) a cross-linked chloroprene polymer when prepared by the process according to the present invention and (b) a solid benzene-soluble chloroprene polymer as hereinafter defined, wherein the weight of cross-linked chloroprene polymer in relation to the total weight of solid benzene-soluble chloroprene polymer and cross-linked chloroprene polymer in the composition is in the range 20 to 80 percent. The preferred range is 25 to 50 percent.

Any solid benzene-soluble polymer of the prior art is suitable for use in these compositions. By "benzene soluble" is meant that the polymer will dissolve in benzene at room temperature. Benzene solubility may be demonstrated by known techniques, for example a 2 to 3 gram sample of the polymer will dissolve in about 250 millilitres of benzene at room temperature after about 5–10 hours with mild agitation. By "solid" is meant that the polymer has a Mooney viscosity ML 4' of at least 25 at 100° C.

The polymer compositions are preferably made by mixing the latices of the polymer components and then isolating the composition by conventional methods such as freeze coagulation, or drum drying.

The present invention is illustrated by the following examples.

Example 1

A cross-linked chloroprene polymer was prepared using the following recipe:

|  | Gms. |
|---|---|
| Chloroprene _____gms__ | 1300 |
| Distilled water _____mls__ | 1500 |
| Dresinate 214 (a regd. trademark) (80% solids) gms__ | 64.0 |
| Daxad 15 (a regd. trademark) _____gms__ | 9.1 |
| NaOH (5.2% wt./volume) _____mls__ | 100 |

Catalyst A.—1 gm. ammonium persulphate made up to 500 mls. with 5.2% NaOH (wt./vol.)

Catalyst B.—2 gms. ammonium persulphate made up to 500 mls. with 5.2% NaOH (wt./vol.)

All components except the chloroprene monomer and catalysts were heated to 85° C. with stirring, under nitrogen, under which the whole reaction took place. 10 mls. of catalyst B were added, and then the chloroprene was pumped in at a constant rate over six hours together with catalyst A at the rate of 9 mls./hr. After six hours all monomer had been added and catalyst B was then pumped in at 9 mls./hr. in place of catalyst A. 96 percent of monomer was converted to polymer (i.e. ratio $R \times 100$) at the final stage of the polymerisation. The average value $\bar{R}$ was 0.76 and the average temperature $\bar{T}$ was 85° C.

This latex was blended with a conventional solid benzene-soluble mercaptan modified chloroprene polymer latex in the proportions given in Table 1 and co-precipitated.

The blended rubber was compounded with rubber compounding ingredients in the usual way in the following formulation:

| | Parts by weight |
|---|---|
| Blended rubber _____ | 100 |
| Phenyl β-naphthylamine _____ | 2 |
| Magnesium oxide _____ | 4 |
| Stearic acid _____ | 0.5 |
| Carbon black _____ | 29 |
| Zinc oxide _____ | 5 |
| Ethylene thiourea _____ | 0.5 |

The compounded rubber thus made was fed into a laboratory extruder and extruded at 60° C. through a triangular die, similar in shape to a Garvey die, specifically designed to show up differences of extrusion characteristics. The property measured was die swell (percent) which is defined as:

$$100\left(\frac{\text{calculated area of cross-section of extrudate}}{\text{measured area of die}} - 1\right)$$

The area of cross-section of the extrudate was calculated from measurements of length, weight and density. The lower the die swell the less the distortion of the extrudate after extrusion, which was considered a measure of easy processing.

Table 1 shows the improvement brought about by blending with different proportions of cross-linked polymer. A compound containing unblended solid benzene soluble polymer is shown by way of comparison.

TABLE 1

| Wt. of solid benzene soluble polymer in the blend | Wt. of cross-linked polymer in the blend | Die Swell (percent) |
|---|---|---|
| 100 | ---- | 64.0 |
| 70 | 30 | 33.0 |
| 60 | 40 | 23.0 |

Example 2

A cross-linked chloroprene polymer was prepared using the following recipe:

| Chloroprene _____gms__ | 1300 |
|---|---|
| Distilled water _____mls__ | 1500 |
| Dresinate 214 (a regd. trademark) (80% solids) gms__ | 64.0 |
| Daxad 15 (a regd. trademark) _____gms__ | 9.1 |
| NaOH (5.2% wt./vol.) _____mls__ | 100 |

Ammonium persulphate, 2 gms. made up to 500 mls. with 5.2% NaOH (wt./vol.)

All components except the chloroprene monomer and catalyst were heated to 85° C. with stirring under nitrogen, and 10 mls. of ammonium persulphate solution were added. The chloroprene was then pumped in at a constant rate over three hours, and at the same time the persulphate solution was added at the rate of 9 mls./hr. The nitrogen blanket was maintained throughout the reaction.

90 percent of monomer was converted to polymer (i.e. ratio $R \times 100$) at the final stage of the polymerisation. The average value $\bar{R}$ was 0.70 and the average temperature $\bar{T}$ was 85° C.

This latex was blended with the same benzene soluble chloroprene polymer as that described in Example 1 in the proportions given in Table 2 and co-precipitated. The blends were compounded and extruded in the same way as for Example 1. Table 2 shows the improvement brought about by blending different proportions of cross-linked polymer. A compound containing unblended solid benzene soluble polymer is given by way of comparison.

TABLE 2

| Wt. of solid benzene soluble polymer in the blend | Wt. of cross-linked polymer in the blend | Die Swell (percent) |
|---|---|---|
| 100 | ---- | 64.0 |
| 70 | 30 | 37.5 |
| 60 | 40 | 25.0 |

Example 3

A cross-linked chloroprene polymer was prepared using the following recipe:

| | |
|---|---:|
| Chloroprene _____gms__ | 1300 |
| Distilled water _____mls__ | 1500 |
| Dresinate 214 (a regd. trademark) _____gms__ | 64.0 |
| S.D.D. 4 (A regd. trademark for a preparation of a sodium salt of decyl benzene sulphonic acid) gms__ | 13.0 |
| Daxad 15 (a regd. trademark) _____gms__ | 9.1 |
| NaOH (5.2% wt./vol.) _____mls__ | 170 |
| Ammonium persulphate _____ | (1) |

[1] 1 gm./500 mls. with distilled water.

All components except the chloroprene monomer and catalyst (ammonium persulphate) were heated to 85° C. in a stirred reactor. 10 mls. of catalyst were added and then the chloroprene was pumped in at a constant rate for two hours and at the same time the catalyst added at the rate of 9 mls./hr. A nitrogen blanket was maintained throughout. The average value $\bar{R}$ for this reaction was 0.51 and the average temperature $\bar{T}$ was 85° C.

This latex was blended with a solid benzene soluble chloroprene polymer in the proportions given in Table 3 and co-precipitated. The blends were compounded and extruded in the same way as for Example 1. Table 3 shows the improvement brought about by blending different proportions of cross-linked polymer. A compound containing unblended solid benzene soluble polymer is given by way of comparison.

TABLE 3

| Wt. of solid benzene soluble polymer in the blend | Wt. of cross-linked polymer in the blend | Die Swell (percent) |
|---|---|---|
| 100 | | 80.0 |
| 70 | 30 | 56.0 |
| 60 | 40 | 49.0 |

Note that while die swell was reduced by addition of the cross-linked polymer the reduction was not as great as in Examples 1 and 2, since $\bar{R}$ was near the lower limit although $\bar{T}$ was in the preferred range. This showed that the conditions for both $\bar{R}$ and $\bar{T}$ needed to be satisfied simultaneously for good results.

Example 4

A cross-linked polychloroprene polymer was prepared using the following recipe:

| | |
|---|---:|
| Chloroprene _____gms__ | 1300 |
| Distilled water _____mls__ | 1410 |
| Dresinate 214 (A regd. trademark) _____g__ | 64.0 |
| Daxad 15 (A regd. trademark) _____g__ | 9.1 |
| NaOH (5.2% w/v) _____mls__ | 100 |
| Ammonium persulphate _____ | (1) |

[1] 6.00 g./500 mls. with 2½% NaOH w./v.

All components except monomer and persulphate were heated to 70° C. with stirring. The whole reaction took place under a nitrogen blanket. When 70° C. was reached, 40 mls. of persulphate solution were added followed by the chloroprene, which was pumped in at a fixed rate over the next 2 hrs. 20 mins., and more persulphate, which was pumped at the rate of 20 mls./hr. for the duration of the polymerisation. When 95% conversion was reached after 4 hrs. polymerization was stopped by stopping the catalyst and cooling to room temperature. $\bar{R}$ was calculated as 0.68 and $\bar{T}$ was 70° C.

This cross-linked polymer was blended with a conventional solid benzene soluble polymer and the blends were compounded and extruded as in Example 1. Die swell is shown in Table 4 where a compound containing unblended solid benzene soluble polymer is given by way of comparison.

TABLE 4

| Wt. of solid benzene soluble polymer in the blend | Wt. of cross-linked polymer in the blend | Die Swell (percent) |
|---|---|---|
| 100 | | 70 |
| 80 | 20 | 56 |
| 60 | 40 | 29 |

$\bar{R}$=0.62 and blended with solid benzene soluble polymer was made with the above recipe at $\bar{T}$=50° C. and $\bar{R}$=0.62 and blended with solid benzene soluble polymer in the same proportions. An easy processing blend was not produced. In fact the processability of the blend was so bad that it was not possible to make an extrudate coherent enough to measure the die swell.

Example 5

A cross-linked polymer was prepared using the following recipe:

| | |
|---|---:|
| Chloroprene _____gms__ | 9100 |
| Distilled water _____mls__ | 11300 |
| Dresinate 214 (a regd. trademark) _____g__ | 672.0 |
| Daxad 15 (a regd. trademark) _____g__ | 67.3 |
| NaOH (5.2% wt./vol.) _____mls__ | 700 |
| Ammonium persulphate _____ | (1) |

[1] 2 g./500 mls. with 5.2% NaOH (wt./vol.).

All components except monomer and persulphate were heated to 70° C. with stirring. The whole reaction took place under a nitrogen blanket. When 70° C. was reached, 70 mls. of persulphate solution were added and the chloroprene was pumped in at a fixed rate over the next 3 hrs., and persulphate solution at 63 mls./hr. throughout polymerisation. When conversion reached 92% after 5 hrs. the persulphate was stopped and the latex cooled to room temperature to end polymerisation. $\bar{R}$ was calculated as 0.61 and $\bar{T}$ was 70° C.

This cross-linked polymer was blended with two solid benzene soluble polymers, one a conventional polymer with a Mooney viscosity (ML4') of about 48, the other a low molecular weight polychloroprene with ML4'<25, which was added only in a minor proportion (7½%). The blend was compounded and extruded in the same way as for Example 1. Table 5 shows the improvement brought about by blending the cross-linked polymer. A compound containing unblended solid polymer of ML4' 48 is given by way of comparison.

TABLE 5

| Wt. of solid benzene soluble polymer of ML4' 48 in blend | Wt. of solid benzene soluble polymer of low molecular weight in blend | Wt. of cross-linked polymer in blend | Die Swell (percent) |
|---|---|---|---|
| 100 | | | 74 |
| 62.5 | 7.5 | 30 | 48.5 |

Extrudates of the blend had a very smooth surface, clearly defined edges and a relatively low die swell.

I claim:
1. A process for making a cross-linked chloroprene polymer which comprises polymerising 2-chloro-1,3-butadiene or 2-chloro-1,3-butadiene and no more than 20 percent by weight based on the total weight of monomeric material of a copolymerisable monomer in an aqueous emulsion system using incremental or continuous addition of monomer material at an average temperature $\bar{T}$ in the range of from 70° C. to 85° C. and an average value $\bar{R}$ in the range of from 0.65 to 0.75 for the conversion ratio R where

$$\bar{T}=\int_0^{t_f} \frac{T}{t_f} \cdot dt$$

where T is the centigrade temperature at any stage during the polymerisation, $t$ is the time after polymerisation is initiated and $t_f$ is the time when the polymerisation is stopped, $$\bar{R} = \int_0^{P_f} \frac{\frac{P}{P+M}}{P_f} \cdot dP$$

where $P_f$ is the total weight of polymer formed at the end of the polymerisation, and P and M are the weights of polymer and monomeric material respectively present at any stage in the polymerisation
and $$R = \frac{\text{weight of polymer}}{\text{weight of polymer plus unpolymerised monomeric material}}$$

2. A cross-linked chloroprene polymer when prepared according to the process of claim 1.

3. A cross-linked polymer composition comprising (a) a cross-linked chloroprene polymer prepared according to the process of claim 1 and (b) a solid, benzene soluble chloroprene polymer wherein the weight of cross-linked polymer in relation to the total weight of solid, benzene soluble chloroprene polymer and cross-linked chloroprene polymer in the composition is in the range of from 20 to 80 percent.

4. A composition according to claim 3 wherein the weight of cross-linked chloroprene polymer in relation to the total weight of solid, benzene soluble chloroprene polymer and cross-linked chloroprene polymer in the composition is in the range of from 25 to 50 percent.

References Cited

UNITED STATES PATENTS 2,962,475  11/1960  Malz et al. _____ 260—92.3
3,147,317   9/1964  Jungk et al. _____ 260—890

MURRAY TILLMAN, *Primary Examiner.*

M. J. TULLY, *Assistant Examiner.*